(12) United States Patent
Haumont

(10) Patent No.: US 9,094,947 B2
(45) Date of Patent: Jul. 28, 2015

(54) COMBINING IP AND CELLULAR MOBILITY

(75) Inventor: Serge Haumont, Helsinki (FI)

(73) Assignee: Nokia Corporation, Espoo (FI)

( * ) Notice: Subject to any disclaimer, the term of this patent is extended or adjusted under 35 U.S.C. 154(b) by 520 days.

(21) Appl. No.: 11/651,013

(22) Filed: Jan. 9, 2007

(65) Prior Publication Data

US 2007/0165655 A1 Jul. 19, 2007

(30) Foreign Application Priority Data

Jan. 16, 2006 (EP) .................................... 06000853

(51) Int. Cl.
*H04W 4/00* (2009.01)
*H04W 76/02* (2009.01)
*H04W 8/04* (2009.01)
*H04W 80/04* (2009.01)
*H04W 92/02* (2009.01)

(52) U.S. Cl.
CPC .............. *H04W 76/021* (2013.01); *H04W 8/04* (2013.01); *H04W 80/04* (2013.01); *H04W 80/045* (2013.01); *H04W 92/02* (2013.01)

(58) Field of Classification Search
CPC .................................................. H04W 76/021
USPC ........ 370/328–338; 455/422.1–460, 524–525
See application file for complete search history.

(56) References Cited

U.S. PATENT DOCUMENTS

| | | | | | |
|---|---|---|---|---|---|
| 6,137,783 | A | * | 10/2000 | Sallberg ......................... | 370/331 |
| 6,374,109 | B1 | * | 4/2002 | Shaheen et al. ................ | 370/343 |
| 6,385,451 | B1 | * | 5/2002 | Kalliokulju et al. .......... | 370/331 |
| 2001/0043579 | A1 | * | 11/2001 | Tourunen et al. .............. | 370/331 |
| 2002/0122432 | A1 | * | 9/2002 | Chaskar ........................ | 370/329 |
| 2003/0235176 | A1 | * | 12/2003 | Zhang et al. .................. | 370/328 |
| 2004/0233866 | A1 | | 11/2004 | Bossoli et al. | |
| 2004/0246933 | A1 | | 12/2004 | Valko et al. | |

FOREIGN PATENT DOCUMENTS

| | | |
|---|---|---|
| CA | 2281752 | 7/2007 |
| CN | 1543152 | 11/2006 |
| EP | 1 435 748 A1 | 7/2004 |
| EP | 1435748 A1 | 7/2004 |
| EP | 1 531 645 A1 | 5/2005 |
| EP | 1531645 A1 | 5/2005 |
| WO | 99/33226 | 7/1999 |
| WO | 02/28123 | 4/2002 |
| WO | WO-2004110092 A1 | 12/2004 |

OTHER PUBLICATIONS

F. Johansson, "Mobile IPv4 Extension for Carrying Network Access Identifiers," Jun. 2004; pp. 1-8.

(Continued)

*Primary Examiner* — Kashif Siddiqui
(74) *Attorney, Agent, or Firm* — Mintz Levin Cohn Ferris Glovsky and Popeo, P.C.

(57) ABSTRACT

The invention proposes a system for providing mobility to a terminal through at least two different mobility protocols, wherein a mobility gateway and a terminal share a common mobility session, said common mobility session can be updated through any of the said different mobility protocols, and each mobility protocol provides information to the terminal related to all other mobility protocol during a registration. The invention also proposes a corresponding gateway, a terminal and method.

39 Claims, 8 Drawing Sheets

(56) References Cited

OTHER PUBLICATIONS

Ericsson, 3GPP TSG SA WG2 Architecture S2#49; "Inter access system handover between 3GPP and non-3GPP," Nov. 7-11, 2005; pp. 1-3.
Ericsson, 3GPP TSG SA AG2 Architecture—SA2#50; "Integrated Mobility Architecture," Jan. 16-20, 2006; pp. 1-4.

International Search Report, PCT/IB2007/050088 filed Jan. 11, 2007.

Office Action dated Dec. 9, 2009, issued by the Patent Office of the Russian Federation, in connection with counterpart Russian patent application No. 2008130135.

* cited by examiner

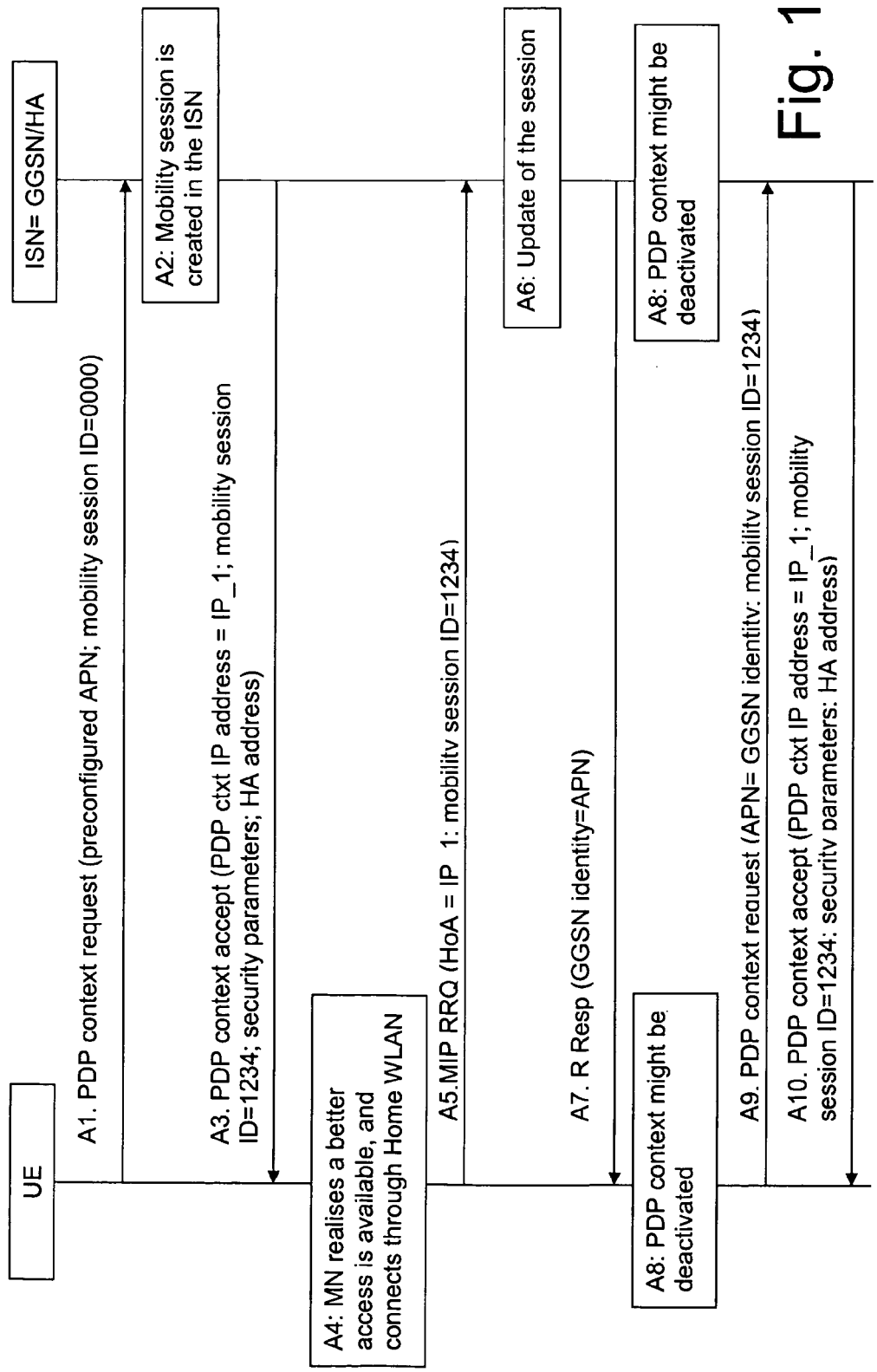

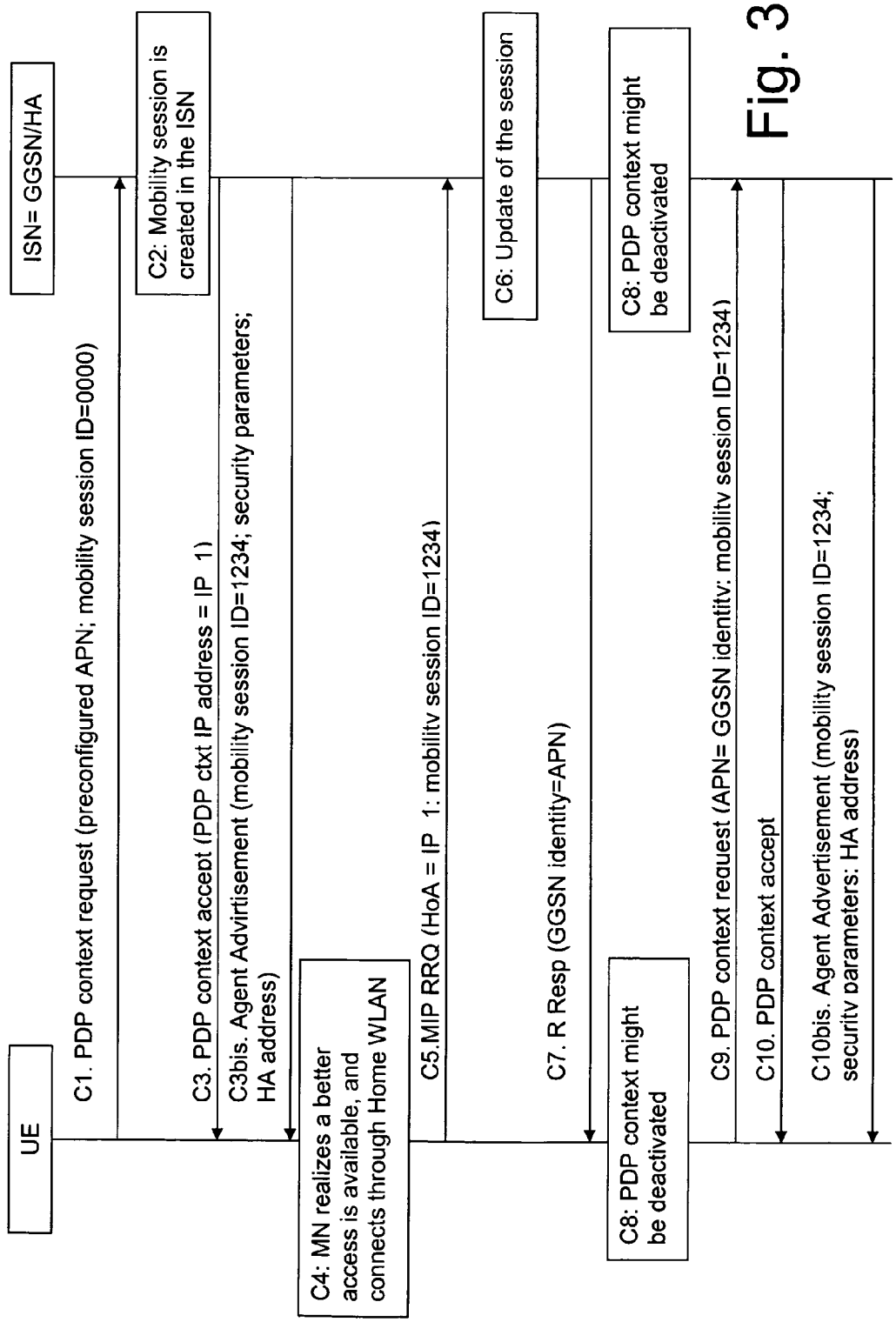

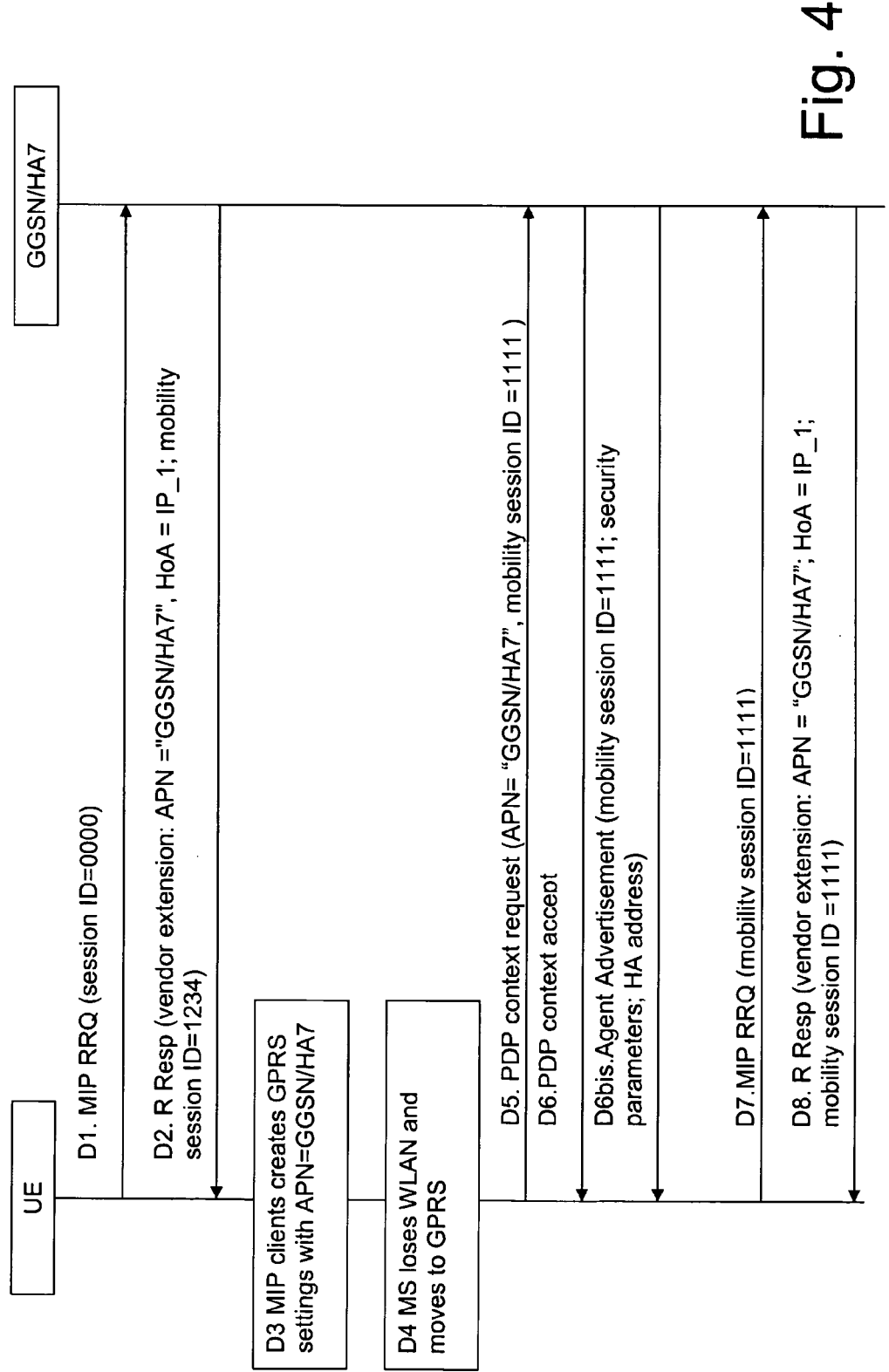

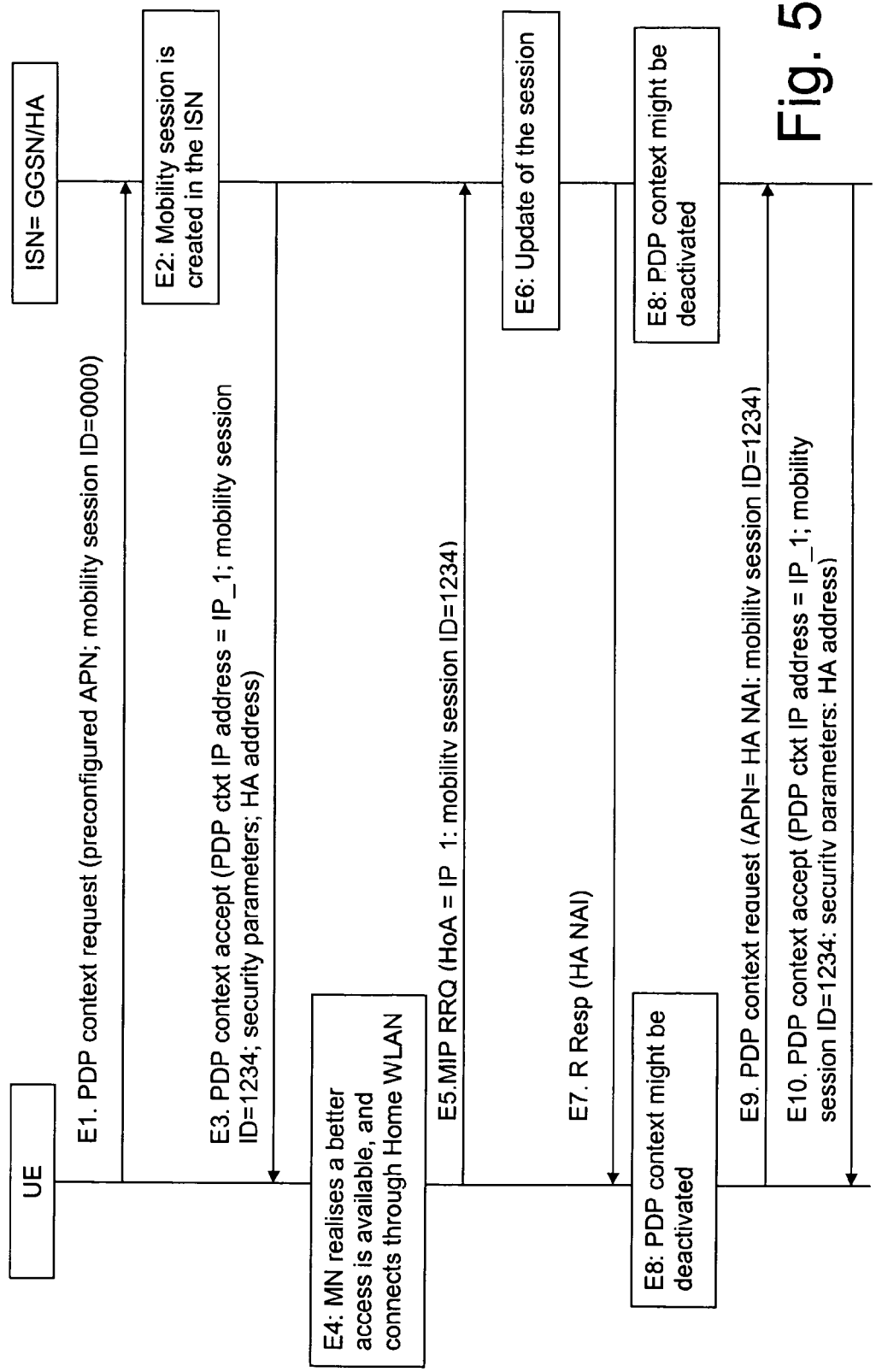

COMBINING IP AND CELLULAR MOBILITY

BACKGROUND OF THE INVENTION

1. Field of the Invention

The invention relates to network control node, a terminal and a method for controlling different types of connection sessions.

2. Description of the Related Art

The invention relates to multi-access and mobility. 3GPP is now discussing various way to implement MA (Mobile Access) mobility.

Currently, there are a number of problems is using many Mobility solutions:

Each mobility solution has its own gateway. Traffic should typically go through many gateway (e.g. GGSN and HA).

Each mobility solution is using some kind of tunnelling. Having many tunnelling is not optimal, especially over cellular access.

Each mobility solution has its own mechanism to select the gateway. Typically, it is difficult to select the same gateway.

In addition, Mobile IPv4 requires a method to configure clients.

Hence, the handling of connection sessions in a network needs to be improved.

SUMMARY OF THE INVENTION

Hence, it is an object of the present invention to solve the problem mentioned above and to provide mobility and session continuity even in case different mobility solutions are provided by a gateway.

According to several embodiments of the present invention, this object is solved by a gateway comprising a supporting unit configured to support a plurality of connection session types; a providing unit configured to provide a connection session to a terminal; and an associating unit configured to associate a parameter with the connection session to the terminal.

Alternatively, according to several embodiments of the invention the object is solved by a terminal comprising a supporting unit configured to support a plurality of connection session types; a providing unit configured to provide a connection session to a gateway; and a receiver configured to receive a parameter which is associated with the gateway.

As a further alternative, according to several embodiments of the invention, the object is solved by a method for controlling a gateway in a network, wherein the gateway is able to support a plurality of connection session types, the method comprising: providing a connection session to a terminal; and associating a parameter with the connection session to the terminal.

Moreover, according to several embodiments of the invention, the object is solved by a method for controlling a terminal, wherein the terminal is able to support a plurality of connection session types, the method comprising: providing a connection session to a gateway; and receiving a parameter which is associated with the gateway.

According to exemplary embodiments of the invention, a system for providing mobility to a terminal through at least two different mobility protocols is provided, wherein:

a mobility gateway and a terminal share a common mobility session, said common mobility session can be updated through any of the said different mobility protocols, and each mobility protocol provides information to the terminal related to all other mobility protocol during a registration.

Thus, even in case a terminal changes the type of connection to a network control element (e.g., from WLAN to GPRS), the connection session as such can be clearly identified. Hence, the mobility and session continuity can be provided even in case different mobility solutions (different connection session types) are provided.

That is, the invention provides a mobility solution in which multiple mobility technology can be combined and session continuity across these multiple mobility technologies is allowed.

BRIEF DESCRIPTION OF THE DRAWINGS

The invention is described by referring to the enclosed drawings, in which:

FIG. 1 shows a signalling flow where the terminal using the integrated mobility session first power-on using GPRS connection session type according to a first embodiment, FIG. 3 shows a signalling flow where the terminal using the integrated mobility session first power-on with GPRS as a connection session type according to a second embodiment, FIG. 4 shows a signalling flow where the terminal using the integrated mobility session first power-on with Mobile IP as a connection session type according to the second embodiment, FIG. 5 shows a signalling flow where the terminal using the integrated mobility session first power-on with GPRS connection session type according to a third embodiment.

DETAILED DESCRIPTION OF THE PREFERRED EMBODIMENT

Figure 2A:
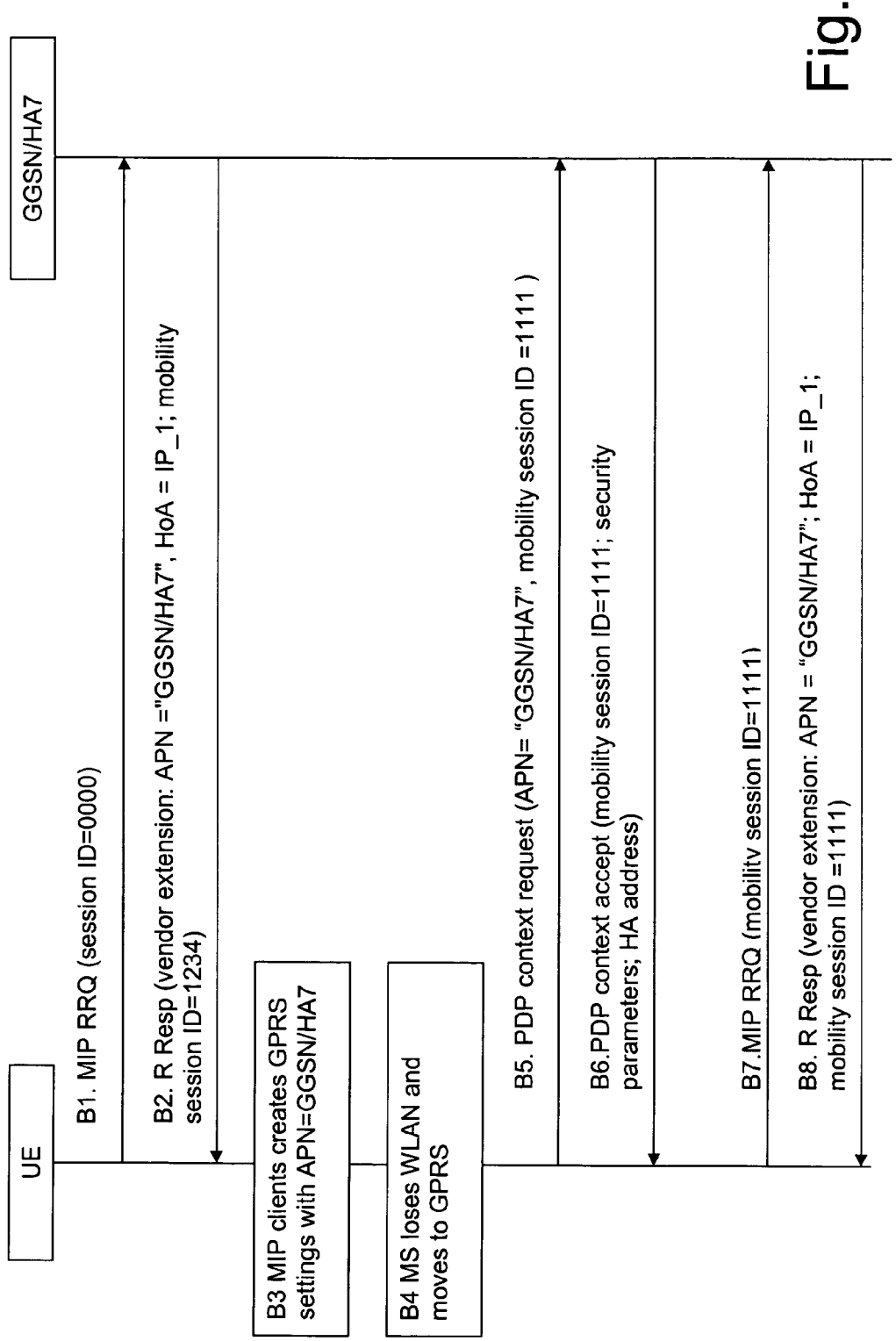
FIG. 2A shows a signalling flow where the terminal using the integrated mobility session first power-on using Mobile IP as a connection session type according to the first embodiment, FIG. 2B a layer structure in terminal and gateway.

In the following, preferred embodiments of the present invention is described by referring to the attached drawings.

In general, the preferred embodiments propose an integrated mobility solution, where one gateway (also referred to as mobility gateway or integrated mobility gateway) supports a single mobility session through more than one mobility technology, and is able to return to the Mobile Node (MN) configuration parameters or session parameter to ensure that the MN will stay connected to this same gateway if mobility technology are used. In particular, the gateway allocates the same home address to the MN when the mobility technology changes during a session, so that the change of mobility technology is invisible to the correspondent node.

Moreover, the terminal (i.e., the Mobile Node (MN)) is having a single mobility session, and has means to update this mobility session through different protocols (3GPP mechanism; Mobile IP; Mobike) depending on the access it is using. Furthermore, after accessing through one protocol, the MN will receive configuration/session parameters, and use them to configure the other protocols part of this mobility session.

In the following, a more detailed example according to a first embodiment is described by referring to the signaling flow shown in FIG. 1.

In this example, it is assumed that an Intelligent Service Node (ISN) (combining GGSN-MIPv4 Home Agent) is the gateway mentioned above, and that the MS first connect over GPRS.

In the following, the signaling flow is described. This is started upon power-on in GPRS, wherein a co-location of GGSN and HA is provided In step A1, the UE (User Entity) or Mobile Station (MS) or Mobile Node (MN) sends a PDP (Packet Data Protocol) context request. Preferably the MS adds an indication that integrated MIPv4 mobility is supported. This is preferably added in the Protocol Configuration Option so that a SGSN transfer it transparently. In FIG. 1, the indication consists of a mobility session ID. A certain value e.g. 0000 indicates that no prior mobility session exists.+

Thereafter, an integrated mobility session is created in the ISN (step A2). This integrated mobility session may be updated through GPRS or MIP as illustrated below. This integrated mobility session will not be terminated if the GPRS session is deactivated. But it will wait for a possible Mobile IP update.

In step A3, the ISN returns a PDP context accept containing its MIPv4 HA (Home Agent) IP address (and/or optionally logical name HA NAI Home Address Network Access Identifier, as defined in RFC3846, for example), a temporary shared secret (valid for this session), a SPI (Security Parameter Index), and optionally a GGSN identity (preferably coded as an APN (Access Point Name)). Optionally, a unique mobility session identifier should be included. These are preferably added in the Protocol Configuration Option so that SGSN transfer it transparently. Note that the IP address returned to the MS in the PDP context activation response will be the MN address for the duration of the mobility session. So it will also be the Mobile IP home address.

That is, as long as the MS stays in GPRS, it considers itself in its home network (from Mobile IP point of view) and does not use Mobile IP. ISN and the MS have a mobility session containing GPRS parameters, and temporary shared secret (valid for this session), SPI (Security Parameter Index). There is no active MIP session, but the MS has configured its Mobile IP stack with the parameters received from PDP context activation procedure (HA address; home address; shared secret; SPI).

In step A4, it is now assumed that the MN detects a WLAN which has higher priority than the cellular network, e.g. its Home WLAN.

Thus, in step A5 it sends a MIP Registration Request (RRQ) to the HA address received in step A3. The authentication field is computed using the temporary shared secret and SPI received in step A3. The RRQ also includes the home address allocated in step A3 by the GGSN. Preferably, the request includes also HA NAI (as proposed in RFC 3846) and mobility session ID as a vendor extension.

In step A6, the ISN receives the request and finds the proper session context using the session ID (Note that overlapping address support is assumed, so Home address is not enough to uniquely identify the MS). The ISN authenticates the MS and accept the request. That is, in step A6, the mobility session is identified through the mobility session ID, security procedures are performed to validate the request, and an update is performed in the ISN to route the session through this new access.

In step A7, a corresponding response (R Resp) is sent to the MS. Optionally, the same mobility session identifier should be included (for protocol simplicity) in the accept message, as well as GGSN identity coded as APN. MIP session is established. E.g., an IP-in-IP tunnel is created and all traffic is now routed to the MS care-off address.

ISN and the MS have a mobility session (referred by unique mobility session ID) containing GTP (GPRS Tunneling Protocol) parameters and MIP parameters. Both sessions are active.

After this, SGSN may release the PDP context based on a timer (there is no data traffic is SGSN). So, in step A8, the PDP context is deactivated. In ISN, the parameters related to the GTP tunnel are erased.

ISN and the MS have a mobility session (referred by unique mobility session ID) containing MIP parameters. The MS also contains the GGSN identity coded as APN. The GTP session is not active.

In step A9, it is assumed that the MS moves back to cellular coverage. As it has an active mobility session it will not use its default APN, but use the one receive in step A3 or A7 (GGSN ID). Standard SGSN will route the request to the same ISN (as only one is associated with this APN). The MS adds the mobility session ID. This is preferably added in the Protocol Configuration Option so that SGSN transfer it transparently.

In step A10, the ISN returns a PDP context accept containing its MIPv4 HA IP address (and optionally logical name HA NAI, as in RFC3846), temporary shared secret (possibly a new one valid for this session), SPI (Security Parameter Index), and GGSN identity (preferably coded as an APN). Optionally, the same mobility session identifier should be included (for protocol simplicity). These are preferably added in the Protocol Configuration Option so that SGSN transfer it transparently.

In the following, another example is described by referring to the signaling flow shown in FIG. 2A. In this example, an Intelligent Service Node ISN (combining GGSN-MIPv4 Home Agent) is assumed, and it is assumed that the MS first connects over Mobile IP (MIP).

The signaling flow is as follow, which shows in particular a power-on in WLAN, and then a movement to GPRS, wherein GGSN & HA co-location is ensured.

In step B1, the MN connects through, e.g., a WLAN by sending a MIP Registration Request to a preconfigured HA address. The authentication field is computed using preconfigured shared secret and SPI. The RRQ also includes the MN NAI, in order to request a dynamic home address allocation. Preferably, the request includes also mobility session ID set to 0000 as a vendor extension.

In step B2, the ISN receives the request, authenticates the MN, and detects it is a new session (since session ID is 000 in step B1), allocates dynamically a home address, as well as a unique session identifier. The ISN returns GGSN identity coded as APN in the accept message. A MIP session is established. E.g., an IP-in-IP tunnel is created and all traffic is now routed to the MS care-off address.

Figure 2B:
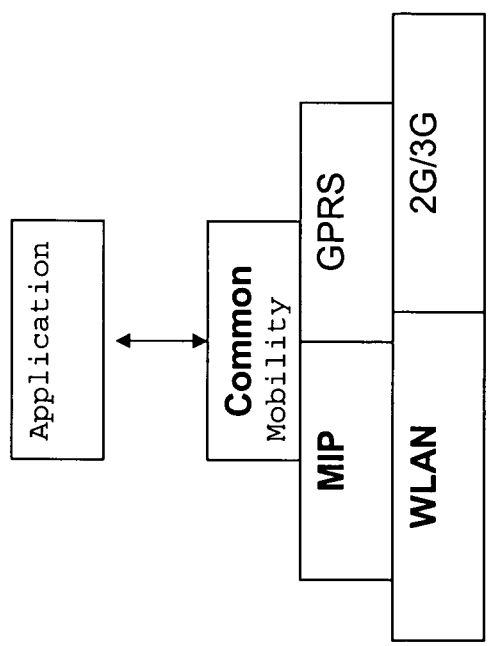

In step B3, the MN updates its GPRS configuration with the received APN for the duration of this mobility session. This is also illustrated in FIG. 2B, in which the corresponding lay structure is illustrated. MIP, IP and WLAN is shown in bold in order to emphasize the settings.

The layer structure is the same for the terminal and for the gateway.

Moreover, the terminal may be a single device (e.g. mobile phone) or consists of many different device.

For example, the common mobility layer may be on a laptop while the GPRS layer may be on a data card.

As to the layer structure, it is noted that on top a common mobility layer is present.

In the terminal, this common mobility layer provides:
a virtual interface to the application.
A single home address common between MIP and GPRS
Possibility to change between GPRS and MIP without impact to the application
At the start of a session or during updates, the common mobility layer will configure one stack (e.g. GPRS) with the information received (GPRS APN; common session ID) through the other stack (e.g. MIP)

In the following, the layer structure for the gateway is described, which is the same as shown in FIG. 2B.

The gateway is typically integrating many mobility technologies.

The common mobility layer in the gateway:
Controls the registration procedure.
Generates the information to be sent during the registration procedure to the MS (e.g. home address . . . )
Generates unique session ID
Maintains the session when the mobility protocol is changed
hides change between GPRS and MIP to any external correspondent nodes
At the start of a session a session and during updates, the common mobility layer will provide one stack (e.g. GPRS) with the information to be sent to the terminal (MIP HA address; security parameters; HA names; common session ID) related the other stack (e.g. MIP)

In step B4, it is now assumed that the MN loses WLAN connectivity, so that it now moves to GPRS.

Thus, in step B5, the MN sends a create PDP request including the mobility session ID received in step B2 and using APN received in step B2. The SGSN selects the GGSN normally (e.g. with a DNS (Domain Name Server)). The network is configured so that this APN uniquely points to the ISN selected in step B1. mobility session ID is preferably added in the Protocol Configuration Option so that SGSN transfer it transparently.

In step B6, the ISN returns a PDP context accept containing its MIPv4 HA IP address (and optionally logical name HA NAI, as in RFC3846), temporary shared secret, SPI (Security Parameter Index). Optionally, the same mobility session identifier should be included (for protocol simplicity). These are preferably added in the Protocol Configuration Option so that SGSN transfer it transparently.

Step B7 and B8 on the figure shows what happens when the MS moves back to a MIP connection.

In particular, in step B7, the MN sends a MIP RRQ to the ISN, including the mobility session ID (which may be in this case 1111, for example). In step B8, the ISN sends a R Resp to the MN, including the vendor extension defining the ISN (namely APN="GGSN/HA7"), Address of the Home Agent (HoA) and the mobility session ID.

In the following, the Mobile Node implementation is described. A preferred way to implement the MS is to have a combined mobility layer between the application and the GPRS stack/MIP stack. The application will use a virtual interface to connect with this combined mobility layer and receive through this interface its Home address. The combined mobility layer will store in a context the information related to the mobility session, track the active interface (MIP or GPRS), and configure the MIP and GPRS protocol with the appropriate parameters for the active mobility session. When the mobility session is terminated, the combined mobility layer may erase the parameters related to that mobility session. GPRS and MIP stack will then use pre-configured parameters the next time a connection is established.

According to the first embodiment, a mobility session ID is used as the parameter for identifying a connection session (such as a mobility session). Namely, the assumption is that one MN can have many simultaneous sessions. Mobility Session ID is a robust way to uniquely identify the right session. The IP address cannot be used to uniquely identify the session, as private address may overlap.

The MN identity could be used to uniquely identify the session, but it would limit the number of session to one by MN. It is not practical as different mobility protocols typically used different type of identity. That would not support concept like UMTS router (having many computers connected behind one UMTS modem)

As mentioned above, this mobility session ID (also abbreviated as session ID only) can be used that integrated mobility is supported and can be used. This can be indicated in step A1 by a session ID containing only 000000.

Security consideration: The mechanism proposed is reasonably secure as the temporary shared secret is returned over GPRS which is encrypted over the radio. For higher security, this shared secret could be returned in an encrypted form. There are many other possibility to enhance the security but it is not the main topic here.

Backward compatibility: Old GGSN or HA will just ignore the new field. The MS should be able to interwork with them and have separate GPRS and MIP session.

If the first connection is over MIP, the MS needs to have a preconfigured shared secret, and MIP HA. However an alternative is that the MS will always first connect to GPRS. Another alternative is that the MS and network store the parameters from the previous session.

In the following, a second embodiment is described by referring to FIGS. 3 and 4.

According to the first embodiment described above, the GPRS signaling includes MIP parameters, and the MIP signaling includes GPRS parameters. That is, for example the mobility session ID is included in the PDP context accept message (step A3).

However, according to the second embodiment, the GPRS signalling triggers a MIP message (Agent Advertisements) carrying MIP parameters (including the mobility session ID), instead of sending them inside the GPRS signaling.

In FIG. 3, a corresponding modification of the signaling flow of FIG. 1 is shown. Here, the steps C1 to C10 are identical to the steps A1 to A10, except for steps C3 and C10 and the addition of steps C3bis and C10bis.

In steps C3 and C10, only the PDP context accept message is sent, without other parameters. Instead, in steps C3bis and C10bis an Agent Advertisement message including those parameters is sent.

In FIG. 4, a corresponding modification of the signaling flow of FIG. 2 is shown. Here, the steps D1 to D8 are identical to the steps B1 to B8, except for step D6 and the addition of step D6bis.

Similar as in FIG. 3, in step D6, only the PDP context accept message is sent, without other parameters. Instead, in step D6bis an Agent Advertisement message including those parameters is sent.

In the following, a third embodiment is described, in which the parameter for identifying According to this embodiment, HA NAI is used for identifying the ISN. This is shown in FIGS. 5 and 6.

The use of HA NAI is in particular advantageous if there is a cluster of HA behind one IP address. Namely, the HA NAI will uniquely identify one of the HA. In Flexi ISN case it could uniquely identify the right service card. It should be noted that the protocol could be designed so that HA NAI=GGSN APN, providing a unique identity for the ISN.

In a preferred implementation according to the present embodiment, a single logical name is associated to the ISN. This name may be used either as the HA NAI (RFC3846) or as the GPRS APN (Access Point Name). The benefit is that standard MIP signaling can be used (No new vendor extension to send back the APN, but just HA NAI is sent). The client will then use the returned logical name as an APN for the GPRS signaling.

Figure 6:
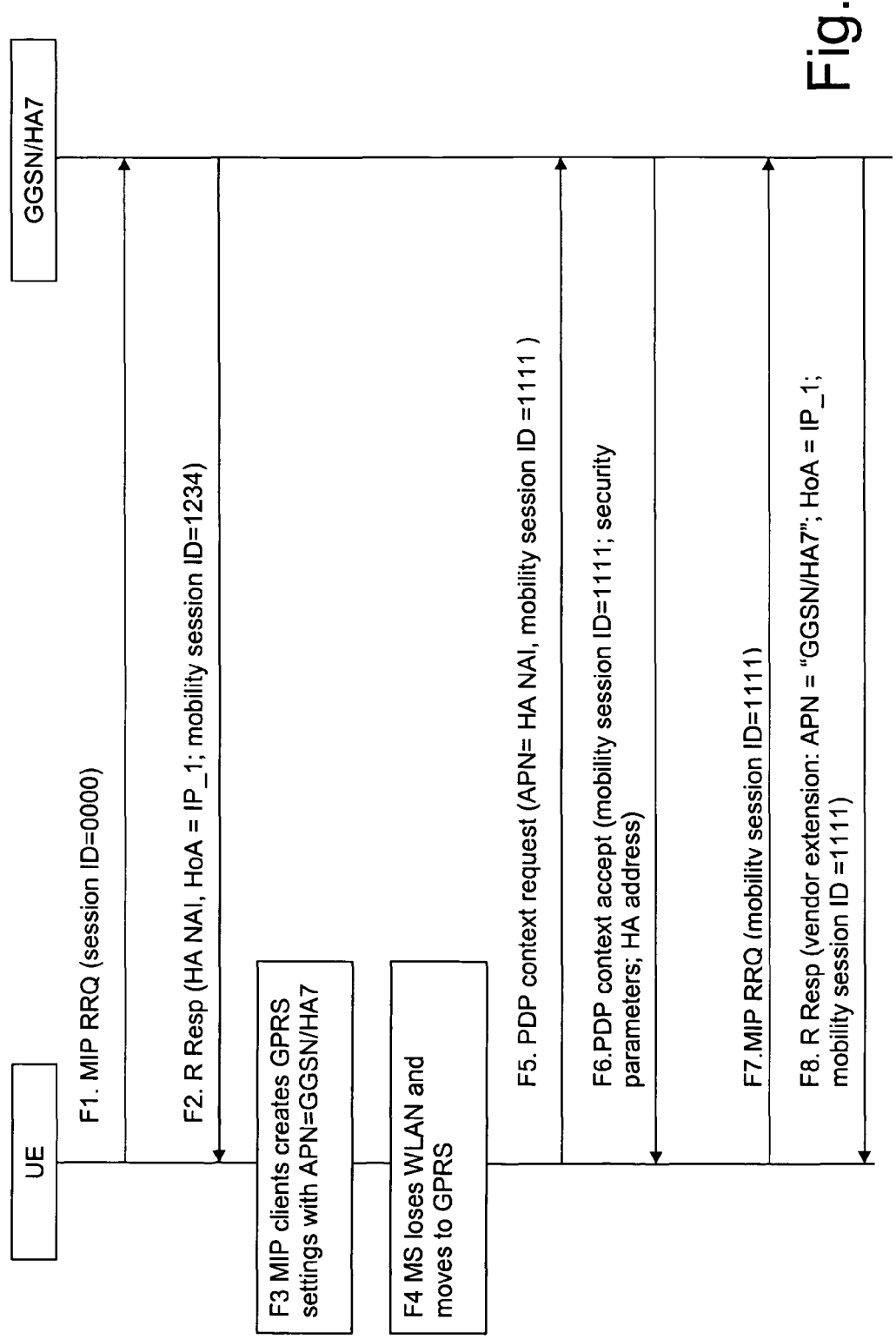
FIG. 6 shows a signalling flow where the terminal using the integrated mobility session first power-on with Mobile IP as a connection session type according to the third embodiment.

This is illustrated in FIGS. 5 and 6, in which steps E1 to E10 and F1 to F8 are identical to steps A1 to A10 and B1 to B8 of FIGS. 1 and 2, respectively, except for steps E7, E9, F2, F5 and F8.

In FIG. 5, in step E7, in the R Resp message, the HA NAI is sent instead of the GGSN identity. This is used for the PDP context request in step E9.

In FIG. 6, in steps F2, F5 and F8, the R Resp contains the HA NAI instead of the vendor extension as in steps B2, B5 and B8 of FIG. 2.

Thus, by means of the embodiments described above, a connection session can always be reliably be identified. The implementation does not cause no overhead over GPRS, it provides a simplified configuration, and traffic will go through only one gateway instead of two. Moreover, 3GPP operators have now a way to retain control of the subscriber.

Figure 7A:
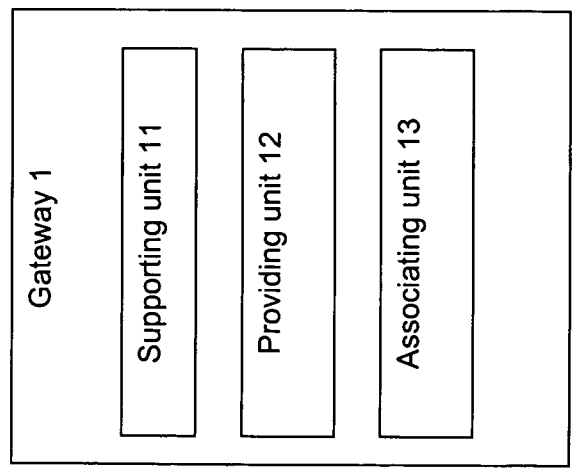
FIG. 7A shows a basic configuration of a gateway according to the embodiments.

FIG. 7A illustrates a basic configuration of a gateway according to the present embodiments. In particular, the gateway 1 may comprise a supporting unit 11 configured to support a plurality of connection session types, a providing unit 12 configured to provide a connection session to a terminal, and an associating unit 13 configured to associate a parameter with the connection session to the terminal.

Figure 7B:
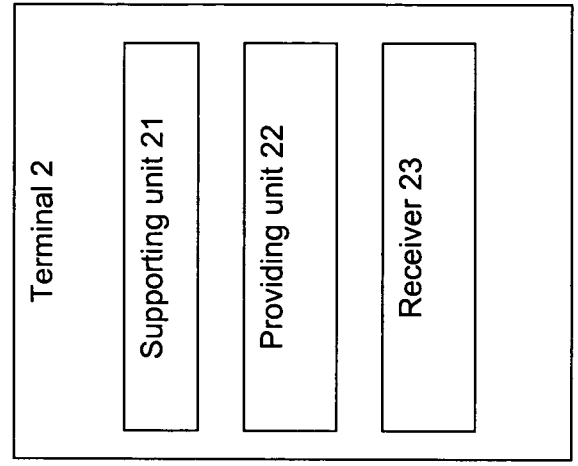
FIG. 7B shows a basic configuration of a terminal according to the embodiments.

FIG. 7B illustrates a basic configuration of a terminal according to the present embodiments. The terminal 2 may comprise: a supporting unit 21 configured to support a plurality of connection session types, a providing unit 22 configured to provide a connection session to a gateway, and a receiver 23 configured to receive a parameter which is associated with the gateway.

The invention is not limited to the embodiment described above, and various modifications are possible.

For example, the invention is not limited to the mobility protocols described above, but is also applicable to other mobility protocols. Following the principles described here, a combined mobility session may support connectivity through more than 2 underlying protocols.

A particularly relevant example is combining the 3GPP LTE (Long Term Evolution) mobility, GPRS and Mobike. In that case, when the IPsec connection is established through Mobike, extension to MObike will provide the MN with the identifier of the ISN (alternatively there might be 2 identifiers one for LTE and one for GPRS) and a unique mobility session identifier. When the MS moves under the 3GPP LTE network it will sends the identifier of the ISN to be connected to the same gateway, and this gateway will uniquely identify the session through the mobility session identifier. As the same IP address will be allocated to the MS, external correspond node will not detect any changes.

Similarly, the invention is also applicable to MIPv6. One difference is that security parameters are slightly different in MIPv6. Another difference in MIPv6, is that the home IPv6 address is unique, and session ID parameter could be avoided in some cases.

Moreover, the invention is not limited to mobile connection sessions only. That is, also fixed network access points could be included. For example, a laptop computer may have access via WLAN, but can also be connected via a network cable.

The invention claimed is:

1. An apparatus comprising:
   at least one processor; and
   at least one memory including computer program code, the at least one processor, the at least one memory, and the computer program code configured to cause the apparatus to at least:
   support a plurality of different connection session types, wherein the plurality of different connection session types comprise mobility protocols including at least one of a general packet radio service tunneling protocol and a mobile internet protocol;
   provide a connection session between the apparatus and a terminal via a first mobility protocol;
   identify the connection session by associating a parameter with the connection session, wherein the parameter comprises a mobility session identifier; and
   provide to the terminal information including the mobility session identifier for configuring a second mobility protocol via the connection session using the first mobility protocol.

2. The apparatus according to claim 1, wherein the connection session comprises a mobility session.

3. The apparatus according to claim 1, wherein the apparatus is further configured to at least:
   include the parameter into a transport protocol message.

4. The apparatus according to claim 3, wherein the transport protocol message is a packet data protocol context accept message.

5. The apparatus according to claim 1, wherein the associated parameter is included in a specific message.

6. The apparatus according to claim 5, wherein the specific message comprises an agent advertisement message.

7. The apparatus according to claim 1, wherein the apparatus is further configured to at least:
   indicate a gateway by a home address network access identifier.

8. An apparatus comprising:
   at least one processor; and
   at least one memory including computer program code, the at least one processor, the at least one memory, and the computer program code configured to cause the apparatus to at least:
   support a plurality of different connection session types, wherein the plurality of different connection session types comprise mobility protocols including at least one of a general packet radio service tunneling protocol and a mobile internet protocol;
   provide a connection session between the apparatus and a gateway via a first mobility protocol;
   identify the connection session by a parameter, wherein the parameter comprises a mobile session identifier; and
   receive at the apparatus information including the mobility session identifier for configuring a second mobility protocol via the connection session using the first mobility protocol.

9. The apparatus according to claim 8, wherein the apparatus is further configured to at least:
   change a type of the connection session; and
   indicate the change of the type to the gateway using the parameter.

10. The apparatus according to claim 8, wherein the connection session comprises a mobility session.

11. The apparatus according to claim 8, wherein the apparatus is further configured to at least:
  receive the parameter within a transport protocol message.

12. The apparatus according to claim 11, wherein the is a packet data protocol, and the transport protocol message is a packet data protocol context accept message.

13. The apparatus according to claim 8, wherein the apparatus is further configured to at least:
  receive the parameter within a specific message.

14. The apparatus according to claim 13, wherein the specific message comprises an agent advertisement message.

15. A method comprising:
  providing a connection session to a terminal via a first mobility protocol;
  associating a parameter with the connection session to the terminal, wherein the parameter comprises a mobility session identifier; and
  providing to the terminal information including the mobility session identifier for configuring a second mobility protocol via the connection session using the first mobility protocol.

16. The method according to claim 15, wherein the connection session comprises a mobility session.

17. The method according to claim 15, further comprising:
  including the parameter into a transport protocol message.

18. The method according to claim 17, wherein the transport protocol message is a packet data protocol context accept message.

19. The method according to claim 15, further comprising:
  including the parameter in a specific message.

20. The method according to claim 19, wherein the specific message comprises an agent advertisement message.

21. The method according to claim 15, wherein a gateway is indicated by a home address network access identifier.

22. A method comprising:
  providing a connection session to a gateway via a first mobility protocol;
  receiving a parameter which is associated with the gateway, wherein the parameter comprises a mobility session identifier; and
  receiving information including the mobility session identifier for configuring a second mobility protocol via the connection session using the first mobility protocol.

23. The method according to claim 22, further comprising:
  changing a type of the connection session; and
  indicating the change of the type to the gateway using the parameter.

24. The method according to claim 22, wherein the connection session comprises a mobility session.

25. The method according to claim 22, wherein the parameter is received within a transport protocol message.

26. The method according to claim 25, wherein the transport protocol message is a packet data protocol context accept message.

27. The method according to claim 22, wherein the parameter is received within a specific message.

28. The method according to claim 27, wherein the specific message comprises an agent advertisement message.

29. The method according to claim 15, wherein the connection session comprises at least one of a mobile internet protocol session or a general packet radio service session.

30. A system comprising:
  a mobility gateway configured to support a plurality of different connection session types, wherein the plurality of different connection session types comprise mobility protocols including at least one of a general packet radio service tunneling protocol and a mobile internet protocol; and
  a terminal, wherein the mobility gateway provides a connection session to the terminal via a first mobility protocol, wherein the connection session is identified by a mobility session identifier, and wherein the gateway is configured to provide to the terminal information including a mobility session identifier for configuring a second mobility protocol via the connection session using the first mobility protocol.

31. The system according to claim 30, wherein the mobility session identifier is exchanged during a registration.

32. The system according to claim 31, wherein the mobility session identifier is sent by the terminal to the mobility gateway in an update message of the mobility protocols.

33. The system according to claim 30, wherein the terminal indicates that it supports the connection session by including the mobility session identifier in a registration message.

34. The apparatus according to claim 1, wherein the apparatus is further configured to send, during a procedure of creating a packet data protocol context, mobile internet protocol parameters to the terminal.

35. The apparatus according to claim 1, wherein during a general packet radio service registration in a create packet data protocol context procedure, mobile internet protocol parameters are sent in an agent advertisement message to the terminal.

36. The apparatus according to claim 34, wherein the mobile internet protocol parameters contain at least one of a home agent internet protocol address, a home agent logical name, and a mobile internet protocol security parameter.

37. The apparatus according to claim 1, wherein during a mobile internet protocol registration, general packet radio service parameters are sent in a registration accept message to the terminal.

38. The apparatus according to claim 37, wherein the general packet radio service parameters comprise a general packet radio service access point name to be used over general packet radio service.

39. The apparatus according to claim 38, wherein the general packet radio service access point name is sent as a home address network access identifier.

* * * * *